United States Patent
Chotimongkol et al.

(10) Patent No.: US 7,742,911 B2
(45) Date of Patent: Jun. 22, 2010

(54) APPARATUS AND METHOD FOR SPOKEN LANGUAGE UNDERSTANDING BY USING SEMANTIC ROLE LABELING

(75) Inventors: Ananlada Chotimongkol, Pittsburgh, PA (US); Dilek Z. Hakkani-Tur, Denville, NJ (US); Gokhan Tur, Denville, NJ (US)

(73) Assignee: AT&T Intellectual Property II, L.P., New York, NY (US)

(*) Notice: Subject to any disclaimer, the term of this patent is extended or adjusted under 35 U.S.C. 154(b) by 1033 days.

(21) Appl. No.: 11/095,299

(22) Filed: Mar. 31, 2005

(65) Prior Publication Data
US 2006/0080101 A1  Apr. 13, 2006

Related U.S. Application Data

(60) Provisional application No. 60/618,049, filed on Oct. 12, 2004.

(51) Int. Cl.
*G06F 17/28* (2006.01)
(52) U.S. Cl. .......................................... 704/4
(58) Field of Classification Search ............ 704/4, 704/9, 251, 254
See application file for complete search history.

(56) References Cited

U.S. PATENT DOCUMENTS

| | | | | |
|---|---|---|---|---|
| 5,323,316 | A * | 6/1994 | Kadashevich et al. | 704/9 |
| 5,768,603 | A * | 6/1998 | Brown et al. | 704/9 |
| 5,805,832 | A * | 9/1998 | Brown et al. | 711/1 |
| 5,966,686 | A * | 10/1999 | Heidorn et al. | 704/9 |
| 6,501,833 | B2 * | 12/2002 | Phillips et al. | 379/88.07 |
| 7,003,444 | B2 * | 2/2006 | Weise | 704/9 |
| 7,349,840 | B2 * | 3/2008 | Budzinski | 704/9 |
| 7,392,185 | B2 * | 6/2008 | Bennett | 704/243 |
| 7,596,485 | B2 * | 9/2009 | Campbell et al. | 704/9 |
| 2006/0095250 | A1 * | 5/2006 | Chen et al. | 704/9 |

FOREIGN PATENT DOCUMENTS

| | | |
|---|---|---|
| EP | 0 413 132 | 2/1991 |
| EP | 1 094 406 | 4/2001 |
| WO | WO 98/09228 | 3/1998 |

OTHER PUBLICATIONS

X. Carreras, et al., "Introduction of the CoNLL-2004 Shared Task: Semantic Role Labeling", Talp Research Centre, Technical University of Catalonia (UPC).

Kadri Haciglu, et al., "Semantic Role Labeling by Tagging Syntactic Chunks", University of Colorado at Boulder, Stanford University, k.

(Continued)

*Primary Examiner*—Michael N Opsasnick (57) ABSTRACT

An apparatus and a method are provided for using semantic role labeling for spoken language understanding. A received utterance semantically parsed by semantic role labeling. A predicate or at least one argument is extracted from the semantically parsed utterance. An intent is estimated based on the predicate or the at least one argument. In another aspect, a method is provided for training a spoken language dialog system that uses semantic role labeling. An expert is provided with a group of predicate/argument pairs. Ones of the predicate/argument pairs are selected as intents. Ones of the arguments are selected as named entities. Mappings from the arguments to frame slots are designed.

24 Claims, 3 Drawing Sheets

OTHER PUBLICATIONS

Harabagiu, Sanda; Maiorano, Steven; Moschitti, Alessandro and Bejan, Cosmin, "Intentions, Implications and Processing of Complex Questions", HLT-NAACL 2004: Workshop on Pragmatics of Question Answering, May 2, 2004, pp. 31-42, Boston, Massachusetts, USA.

Surdeanu, M.; Harabagiu, S; Williams, J. and Aarseth, P., "Using predicate-argument structures for information extraction", Proceedings of the $41^{st}$ Annual Meeting on Association for Computational Linguistics, 2003, pp. 8-15, Sapporo, Japan.

Gildea, D. et al., "Automatic labeling of semantic roles", Internet citation, [online] 2002, Retrieved from the Internet: URL:http://citeseer.ist.psu.edu/gildea02automatic.html>, pp. 2-24, section 6.1 and pp. 34-36, section 9.1.

* cited by examiner

APPARATUS AND METHOD FOR SPOKEN LANGUAGE UNDERSTANDING BY USING SEMANTIC ROLE LABELING

This application claims the benefit of U.S. Provisional Patent Application No. 60/618,049, filed on Oct. 12, 2004 and incorporated herein by reference in its entirety.

BACKGROUND OF THE INVENTION

1. Field of the Invention

The present invention relates to speech processing and more specifically to using semantic role labeling for spoken language understanding.

2. Introduction

Spoken language understanding aims to extract the meaning of the speech utterances. In the last decade, a variety of practical goal-oriented spoken dialog systems (SDS) have been built for limited domains. These systems aim to identify intents of humans, expressed in natural language, and take actions accordingly, to satisfy their request. In such systems, typically, first the speaker's utterance is recognized using an automatic speech recognizer (ASR). Then, the intent of the speaker is identified from the recognized sequence using a spoken language understanding (SLU) component. Finally, the role of a dialog manager (DM) is to interact with the user in a natural way and help the user to achieve the task that the system is designed to support.

A typical SDS example may be a machine-initiative system, in which the user answers the computer prompts using the allowed corresponding phrases, for example, "Please say hotel reservation or car reservation." In such a directed dialog, "understanding" is reduced to the task of detecting one of the keywords allowed in the users' utterances.

A more sophisticated understanding system would allow the users to talk naturally about a single given intent. Such systems have been developed mostly in the framework of government funded projects. For example, in the early 90s, Defense Advanced Research Projects Agency (DARPA) had initiated the Airline Travel Information System (ATIS) project, in which the aim was to integrate the efforts of the speech and language processing communities. In this task, the users could utter queries regarding flight information. An example would be, "I want to fly to Boston from New York next week." In this case, understanding is reduced to the problem of extracting task specific arguments in a given frame, such as Destination and Departure Date. Participating systems either employed a data-driven statistical approach (mostly from the speech processing community), or a knowledge-based approach (mostly from the computational linguistics community). Although both DARPA ATIS and the following Communicator projects are over, they left a testbed for other SLU approaches and lead to similar mixed or machine-initiative commercial applications.

A more general approach would be both determining the intent of the user and extracting the corresponding arguments as in the AT&T How May I Help You?$^{SM}$ (HMIHY) spoken dialog system used for customer care centers. As an example, consider the utterance, "I have a question about my June bill." Assuming that the utterance is recognized correctly, the corresponding intent (call-type) would be Ask (Bill) and the argument for this call-type, i.e., the named entity Date would be extracted as June. Then the action that needs to be taken depends on the DM. The DM may ask the user to further specify the problem or route this call to the billing department. Following the HMIHY system, a number of similar systems were built.

In all these previous works, the semantic representation of the meaning heavily depended on the corresponding task and was predefined. For example, ATIS includes flight reservation related arguments, such as arrival and departure cities. In HMIHY, it is the call-type and the corresponding arguments (named entities) designed according to the incoming call traffic. Call-type classification is used to determine the intent and named entity extraction is used to find the associated arguments. For this purpose, one can use a domain-dependent approach as in the previous works. But this approach has some serious drawbacks:

Training statistical models for intent classification and named entity extraction requires large amounts of labeled in-domain data, which is very expensive and time-consuming to prepare. If rule-based methods are used for these tasks, this requires some human expertise and has similar problems.

Preparation of the labeling guide (i.e., designing the intents and named entities) for a given spoken language understanding task involves non-trivial design decisions. For example if the user says "I wanna cancel my long distance service," one alternative would be labeling it as the intent Cancel(Service) with a named entity Service Type with values such as long distance, international, local, etc. The other option is calling it as a single intent Cancel (LD_Service) with no associated named entity and have other intents such as Cancel(Local_Service), etc. Such decisions depend on the expert who is designing the task structure and the frequency of the intents and named entities for a given task. Furthermore, one expects the intents and named entities to be clearly defined in order to ease the job of the classifier and the human labelers.

Another issue is consistency between different tasks. This is important for manually labeling the data quickly and correctly and making the labeled data reusable across different applications. For example in most applications, utterances like "I want to talk to a human not a machine" appear and can be processed similarly.

On the other hand, in the computational linguistics domain, task independent semantic representations have been proposed over the last few decades. Two notable studies are the FrameNet and PropBank projects. The Propbank project aims at creating a corpus of text annotated with information about basic semantic propositions. Predicate/argument relations are added to syntactic trees of the existing Penn Treebank, which is mostly grammatical written text. Very recently, the PropBank corpus had been used for semantic role labeling (SRL) at the 2004 Conference on Computational Natural Language Learning (ConLL-2004) as the shared task. SRL aims to put "who did what to whom" kind of structures to sentences without considering the application using this information. More formally, given a predicate of the sentence, the goal of SRL is to identify all its arguments and their semantic roles.

The relationship between the arguments of the predicates in a sentence and named entities have been previously exploited by Surdeanu et al. as described in "Using predicate-argument structures for information extraction," Proceedings of the Annual Meeting of the Association for Computational Linguistics, 1993, the contents of which are herein incorporated by reference in its entirety.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a spoken language understanding method is provided. A received utterance semantically parsed by semantic role labeling. A predicate or at least one argument is extracted from the semantically parsed utterance. An intent is estimated based on the extracted predicate or the at least one argument In a second aspect of the invention, a method is provided for training a spoken language dialog system that uses semantic role labeling. An expert is provided with a group of predicate/argument pairs. Ones of the predicate/argument pairs are selected as intents. Ones of the arguments are selected as named entities. Mappings from the arguments to frame slots are designed.

In a third aspect of the invention, an apparatus is provided. The apparatus includes a processor and storage for storing data and a group of instructions for the processor. The apparatus is configured to semantically parse a received utterance by semantic role labeling, extract one of a predicate or at least one argument from the semantically parsed utterance, and estimate an intent based on one of the predicate or the at least one argument.

In a fourth aspect of the invention, an apparatus is provided. The apparatus includes means for semantically parsing a received utterance by semantic role labeling, means for extracting one of a predicate or at least one argument from the semantically parsed utterance, and means for estimating an intent based on one of the predicate or the at least one argument.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Spoken Dialog Systems

Figure 1:
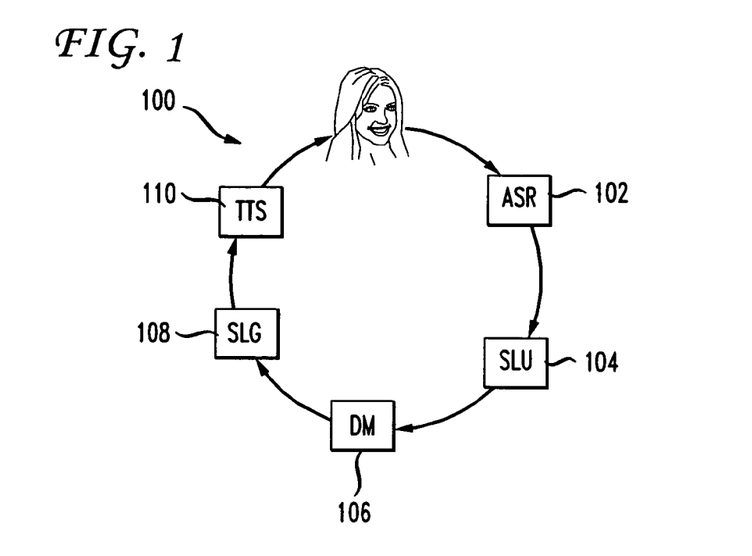
FIG. 1 illustrates an exemplary natural language spoken dialog system consistent with the principles of the invention.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
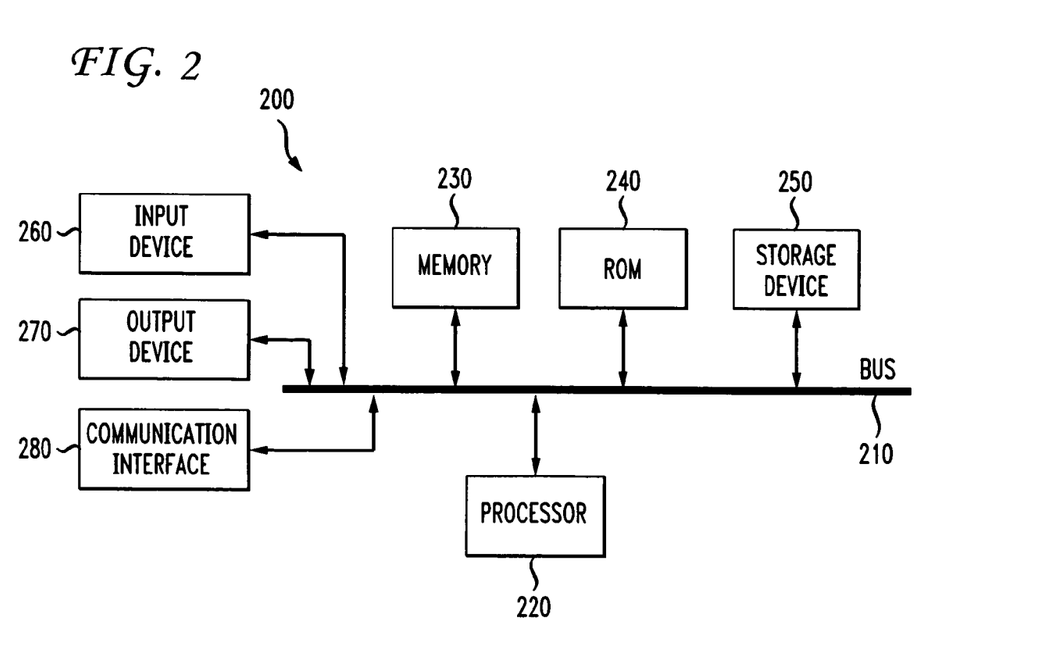
FIG. 2 illustrates an exemplary processing system which may be used to implement an embodiment consistent with the principles of the invention.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220.

Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Semantic Role Labeling

In the CoNLL-2004 shared task, semantic role labeling is defined as the task of analyzing the propositions expressed by some target verbs of the sentence. In particular, the goal of SRL is to extract all the constituents which fill a semantic role of a target verb. Typical semantic arguments include Agent, Patient, Instrument, etc. and also adjuncts such as Locative, Temporal, Manner, Cause, etc. In the PropBank corpus, these arguments are given mnemonic names, such as Arg0, Arg1, Arg-LOC, etc. For example, for the sentence, "I have bought myself a blue jacket from your summer catalog for twenty five dollars last week," the agent (buyer, or Arg0) is I, the predicate is buy, the thing bought (Arg1) is a bluejacket, the seller or source (Arg2) is from your summer catalog the price paid (Arg3) is twenty five dollars, the benefactive (Arg4) is myself, and the date (ArgM-TMP) is last week.

Semantic role labeling can be viewed as a multi-class classification problem. Given a word (or phrase) and its features, the goal is to output the most probable semantic role label. For this purpose, most researchers used statistical classifiers with various syntactic and semantic features. The methods ranged from Support Vector Machines (SVM) to Transformation-Based Error-Driven Learning to Memory-Based Learning. Most approaches focused on extracting the most useful features for superior performance and saw the classification algorithms as black boxes. PropBank corpus includes the semantic roles as well as other linguistic information, which might be useful for this task, such as part of speech tags of the words, named entities, and syntactic parses of the sentences.

In one implementation consistent with the principles of the invention, the same feature set described in, "Semantic role labeling by tagging syntactic chunks," Hacioglu et al., May 2004, Proceedings of the Conference on Computational Natural Language Learning (ConLL), which is herein incorporated by reference in its entirety, may be used. In the approach used by Hacioglu et al., all features have contextual counter-parts. For example, the preceding and following two words, or predicted semantic roles may also be used as features. Furthermore, instead of labeling the semantic role of each word, a phrase-based labeling approach may also be employed, where only head words of phrases may be labeled. This assumes that all words in a phrase have the same semantic role. Each phrase may be represented with the features of the head word. This reduces the number of tokens to be tagged and enables the contextual features to span a larger portion of the sentence. The features may include token-level features (such as the current (head) word, its part-of-speech tag, base phrase type and position, etc.), predicate-level features (such as a predicate's lemma, frequency, part-of-speech tag, etc.) and argument-level features which capture the relationship between the token (head word/phrase) and the predicate (such as the syntactic path between the token and the predicate, their distance, token position relative to the predicate, etc.).

Semantic role labeling of spoken utterances is a research challenge just by itself, for various reasons, such as, for example:

Noisy speech recognition: State of the art ASR systems operate with a word error rate of around 25%. That is, ASR systems misrecognize one out of every four words. This is a big challenge for robust SRL.

Ungrammatical Utterances with dysfluencies: Unlike newspaper articles in the PropBank corpus, input utterances are expected to be more casual and shorter. On the other hand, the input utterances may frequently be ungrammatical and may include dysfluencies, such as repetitions, corrections, etc.

Open domain: Since the same SRL methods are going to be used for various SDS applications, such as customer care systems, automobile interaction systems, etc., the SRL is expected to be robust to domain changes, and usable for many different applications with an acceptable performance.

In the CoNLL-2004 shared task, researchers have found that syntactic information, such as part of speech (POS) tags or syntactic parses and semantic information, such as named entities, are extremely useful for SRL. Thus, implementations consistent with the principles of the invention may syntactically preprocess an utterance and extract named entities before semantically parsing the utterance. Other implementations consistent with the principles of the invention may include a feature extraction step, which may be performed using part-of-speech tagging, syntactic parsing, and named entity extraction to address the above problems, as well.

Domain-Independent Spoken Language Understanding System

In order to build a domain-independent spoken language understanding system, implementations consistent with the principles of the invention may use the predicates and their arguments provided by semantic role labeling of utterances. Following the HMIHY notation, assume that an SLU system extracts two kinds of information from an utterance: intents (call-types) and associated arguments hereinafter, "named entities", to distinguish from the arguments of the predicates). Once an utterance is semantically parsed, the predicates and related arguments may be extracted. One may use the predicates (and some certain arguments) as intents and some of the other arguments as named entities regardless of the application domain. This approach may ensure consistency across various domains and may ease the job of SDS design, which may include the determination of intents, associated named entities represented in frames and the dialog flow. Implementations consistent with the principles of the invention do not require in-domain data that is manually labeled with intents and named entities. However, if some amount of in-domain data labeled with semantic roles is provided, the performance may improve.

Figure 3:
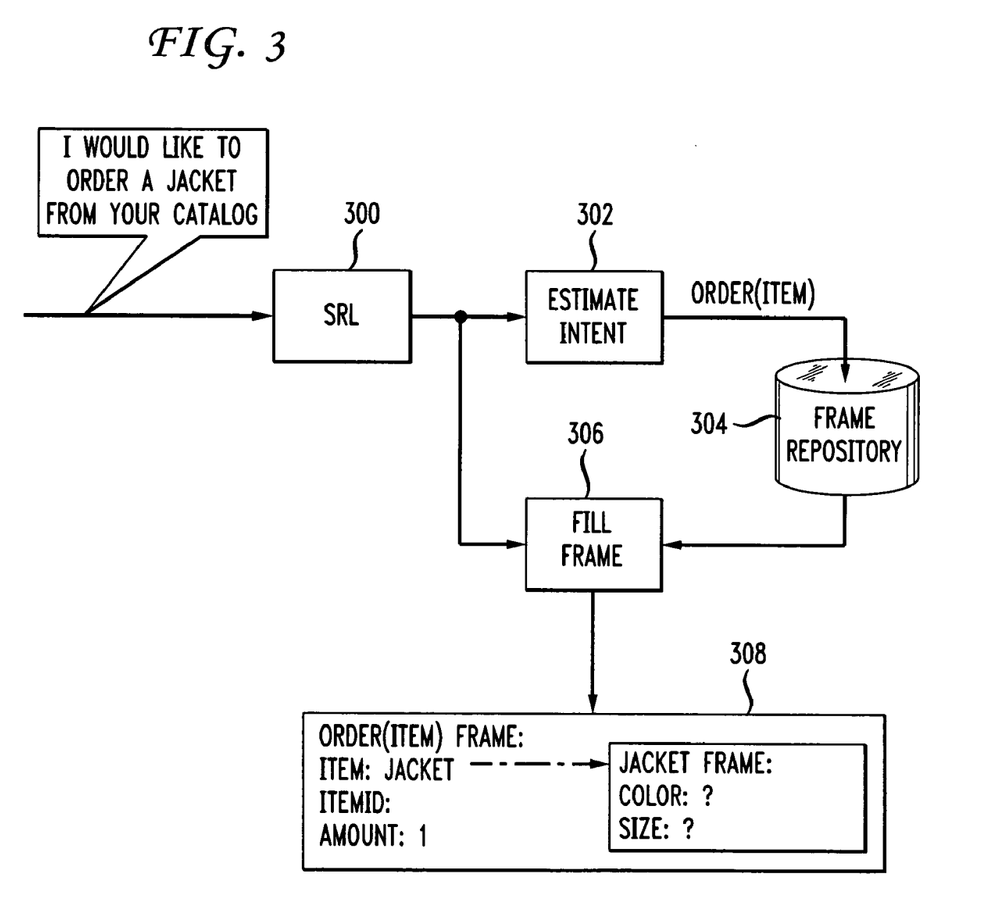
FIG. 3 is a flowchart that illustrates exemplary processing that may be employed in implementations consistent with principles of the invention.

FIG. 3 is a flowchart that illustrates an exemplary process that may be included in implementations consistent with the principles of the invention. An utterance such as, for example, "I would like to order a jacket from your catalog," may be input. A SRL module, which may be included in SLU module 104, may receive the utterance and may semantically parse the utterance to extract the predicates and arguments (act 300). Using the extracted predicates (and possibly some of the arguments) an intent may be estimated (act 302). The estimated intent may be mapped to a frame from a database or frame repository (act 304). Once the frame is determined, frame slots associated with the intent may be known and the extracted arguments from the semantic role labeling may be mapped to the corresponding frame slots (act 306), thereby filling the frame (act 308). In the example of FIG. 3, the utterance, "I would like to order a jacket from your catalog," is mapped to an Order(Item) Frame. The arguments may include the named entities Item, ItemID, and Amount. The estimated intent and corresponding arguments may then be passed to DM 106, which may determine and take appropriate action.

Of course, in some implementations consistent with the principles of the invention, an intent may be estimated from an utterance that may include a predicate and no arguments or the intent may be estimated from an utterance that may include at least one argument and no predicate.

In some implementations consistent with the principles of the invention, the received utterance may be syntactically preprocessed and named entities may be extracted before SRL is performed to semantically parse the utterance. In other implementations consistent with the principles of the invention, feature extraction may be performed using part-of-speech tagging, syntactic parsing, and named entity extraction.

Figure 4:
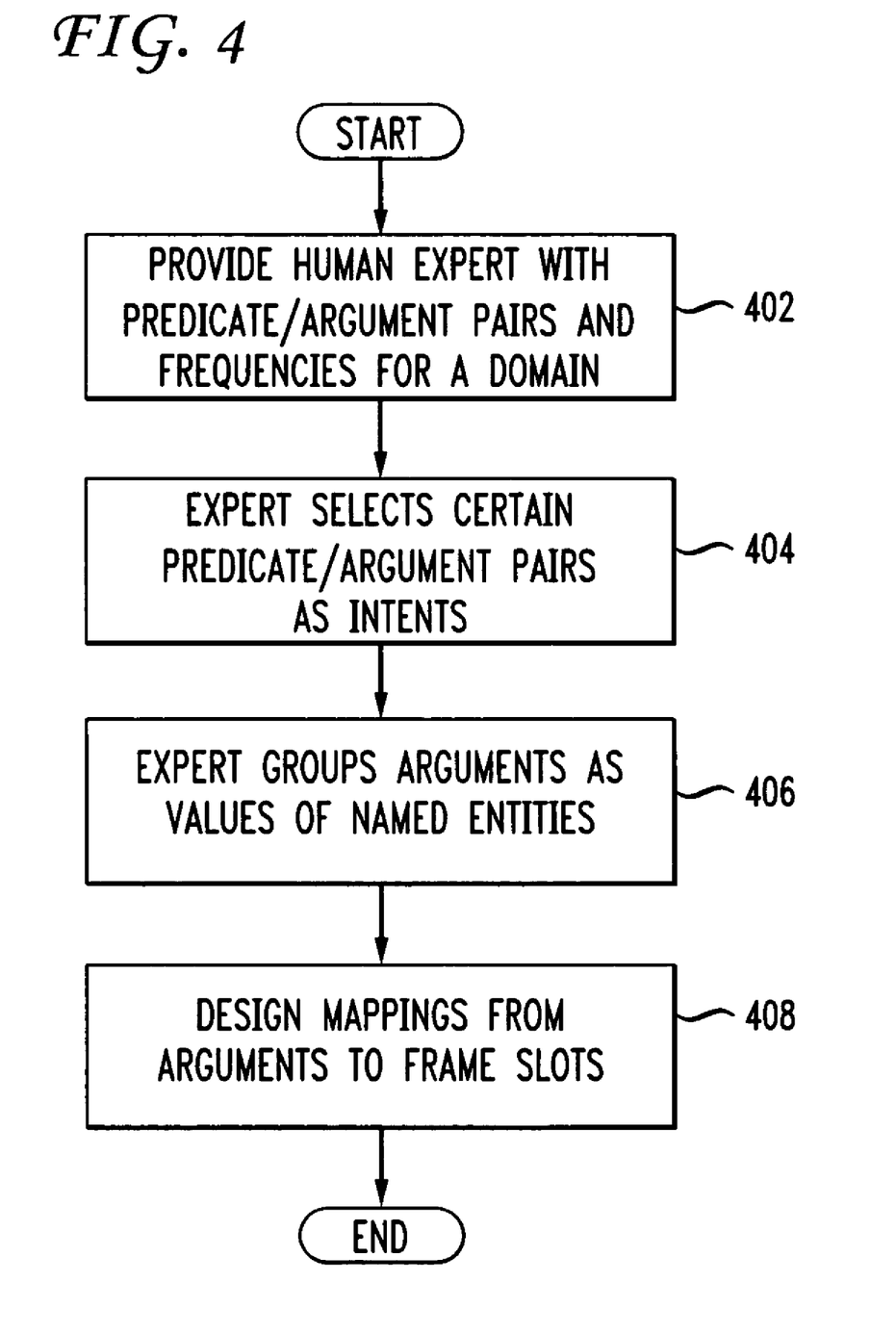
FIG. 4 is a flowchart that illustrates an exemplary method for training a spoken dialog system that uses semantic role labeling for language understanding.

FIG. 4 is a flowchart that illustrates an exemplary process that may be employed in implementations consistent with the principles of the invention to build an application for a spoken language system. While building the application, a human expert may be provided with predicate/argument pairs for a domain, as well as their frequencies (act 402). The expert may then select certain predicate/argument pairs as intents (act 404). Consider, for example, a spoken language understanding application from a retail domain. One intent may be placing an order. For example, the utterance, "I would like to place an order," may be mapped to the intent Place(Order). Semantically equivalent predicates such as make in make/order and place in place/order may be grouped while determining the intents.

The human expert may also group the arguments which can be defined as values of named entities (act 406). For the example application above, some predicate/argument pairs may be order/jacket, order/curtain, etc. Then the expert may group the argument values into a single intent Order(Item), and the grouped argument values may naturally form a named entity, in this case Item, which has values such as jacket and curtain. The frame associated with this intent may have the named entities such as the item itself (Item) along with its characteristics such as quantity (Amount). In cases where the argument is part of the intent, such as check/price and check/availability, no grouping may be necessary.

The mappings from the arguments to frame slots which are filled with named entities may then be designed by the human expert (act 408). For example, for the Order(Item) intent, a head word of the object (Arg1) of the predicate order can be mapped to the named entity Item. The mapping from the arguments to named entities may be seen as another classification problem. Since preparing labeled data for each application may be very costly, a clustering approach may be used to determine the potential named entities. The clustering approach may also be used to determine potential intents from predicate/argument pairs. Such an approach is discussed in Chotimongkol et al., "Automatic concept identification in goal-oriented conversations," Proceedings of the International Conference on Spoken Language Processing (ICSLP), September 2002, which is herein incorporated by reference in its entirety.

During spoken language understanding, using the semantic role labels, first the intent may be extracted, then the associated named entities may be filled. As previously discussed, FIG. 3 depicts this idea. In order to estimate the intent, there is no need for an intent classification phase as in HMIHY-like systems, since it is straightforward to extract the intent using the semantic role labels and the predicate/argument groups provided by a human expert. This is also the case for the arguments mapped to named entities in the frame slots corresponding to the intents. Such associations are kept in the frame repository for each SDS.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described in FIGS. 3 and 4, or may implement acts in a different order than as shown in the flowcharts. Accordingly, the appended claims and their legal equivalents should only define the invention, rather than any specific examples given.

We claim:

1. A spoken language understanding method, the method causing a computing device to perform steps comprising:
   semantically parsing, via a processor of the computing device, a received utterance from a user by semantic role labeling to generate at least one semantic role label for only head words of phrases in the received utterance;
   extracting a predicate from the semantically parsed utterance;
   identifying a syntactic path between head words and their respective extracted predicate;
   estimating an intent of the user based on the extracted predicate and based on predicate/argument pairs, each predicate argument pair comprising a predicate verb and an argument which completes the predicate verb; and
   responding to the received utterance based on the estimated intent.

2. The method of claim 1, further causing the computing device to perform steps comprising extracting at least one argument from the semantically parsed utterance and estimating at least one associated named entity using the at least one argument.

3. The method of claim 1, further causing the computing device to output syntactically preprocess the utterance before using semantic role labeling to semantically parse the utterance.

4. The method of claim 1, further causing the computing device to perform steps comprising:
   mapping the estimated intent to a frame;
   extracting at least one argument from the semantically parsed utterance; and
   mapping the at least one argument to at least one frame slot of the frame.

5. The method of claim 1, further causing the computing device to perform feature extraction of the utterance.

6. The method of claim 5, wherein the performing of feature extraction is performed using part-of-speech tagging, syntactic parsing, and named entity extraction.

7. The method of claim 1, further causing the computing device to output the estimated intent.

8. The method of claim 2, further causing the computing device to output the at least one associated named entity.

9. The method of claim 7, further causing the computing device to perform an action based on the output estimated intent.

10. A method for training a spoken language dialog system that uses semantic role labeling, the method causing a computing device to perform steps comprising:
    providing an expert with a plurality of predicate/argument pairs, each predicate argument pair comprising a predicate verb and an argument which completes the predicate verb;
    selecting, via a processor of the computing device, ones of the predicate/argument pairs as intents;
    selecting, via the processor, ones of the arguments as named entities;
    designing mappings from the arguments to frame slots;
    generating at least one semantic role label for only head words of phrases in the predicate/argument pairs; and
    identifying a syntactic path between head words and their respective extracted predicate.

11. The method of claim 10, further causing the computing device to perform steps comprising:
    grouping the arguments; and
    defining the grouped ones of the arguments as values of a named entity.

12. The method of claim 10, further causing the computing device to use a clustering approach to determine potential named entities from the arguments.

13. The method of claim 10, further causing the computing device to use a clustering approach to determine potential intents from the predicate/argument pairs.

14. The method of claim 10, wherein the provided predicate/argument pairs are from a domain of interest.

15. An apparatus comprising:
    a processor; and
    storage for storing data and a plurality of instructions for the processor, wherein the apparatus is configured to execute the plurality of instructions to control the processor to:
    semantically parse a received utterance by semantic role labeling to generate at least one semantic role label for only head words of phrases in the received utterance;
    extract a predicate from the semantically parsed utterance,
    identify a syntactic path between head words and their respective extracted predicate, and
    estimate an intent based on the extracted predicate and based on predicate/argument pairs, each predicate argument pair comprising a predicate verb and an argument which completes the predicate verb.

16. The apparatus of claim 15, wherein the apparatus is further configured to:
    syntactically preprocess the utterance before semantically parsing the utterance by semantic role labeling.

17. The apparatus of claim 15, wherein the apparatus is further configured to:
    map the estimated intent to a frame;
    extract at least one argument from the semantically parsed utterance; and
    map the at least one argument to at least one frame slot of the frame.

18. The apparatus of claim 15, wherein the apparatus is further configured to:
    perform feature extraction of the utterance.

19. The apparatus of claim 18 wherein the apparatus is configured to perform the feature extraction using part-of-speech tagging, syntactic parsing, and named entity extraction.

20. The apparatus of claim 15, wherein the apparatus is further configured to extract at least one argument from the semantically parsed utterance and estimate at least one associated named entity using the at least one argument.

21. The apparatus of claim 20, where in the apparatus is further configured to output the associated named entities.

22. The apparatus of claim 15, wherein the apparatus is further configured to output the estimated intent.

23. The apparatus of claim 22, wherein the apparatus is further configured to:

perform an action based on the output estimated intent.

24. An apparatus comprising:

a processor;

means for semantically parsing, via the processor, a received utterance by semantic role labeling to generate at least one semantic role label for only head words of phrases in the received utterance;

means for extracting a predicate from the semantically parsed utterance;

means for identifying a syntactic path between head words and their respective extracted predicate means for estimating an intent based the extracted predicate and based on predicate/argument pairs, each predicate argument pair comprising a predicate verb and an argument which completes the predicate verb; and means for responding to the received utterance based on the estimated intent.

* * * * *